March 15, 1955 H. G. M. DE FRANCE 2,704,304

SINGLE CHANNEL TRANSMISSION BY TWO TRANSMITTERS HAVING VIDEO AND SOUND CARRIERS IN REVERSED RELATIONSHIP

Filed Dec. 19, 1950 2 Sheets-Sheet 1

INVENTOR

Henri G. M. De France

BY Ralph B. Stewart

ATTORNEY

INVENTOR
Henri G. M. De France

BY Ralph B. Stewart
ATTORNEY

United States Patent Office 2,704,304

Patented Mar. 15, 1955

2,704,304

SINGLE CHANNEL TRANSMISSION BY TWO TRANSMITTERS HAVING VIDEO AND SOUND CARRIERS IN REVERSED RELATIONSHIP

Henri Georges Marie de France, Paris, France, assignor to Societe Nouvelle de l'Outillage R. B. V. et de la Radio-Industrie (R. B. V.-R. I.), Paris, France Application December 19, 1950, Serial No. 201,580

Claims priority, application France January 10, 1950

2 Claims. (Cl. 178—5.6)

Figure 1:
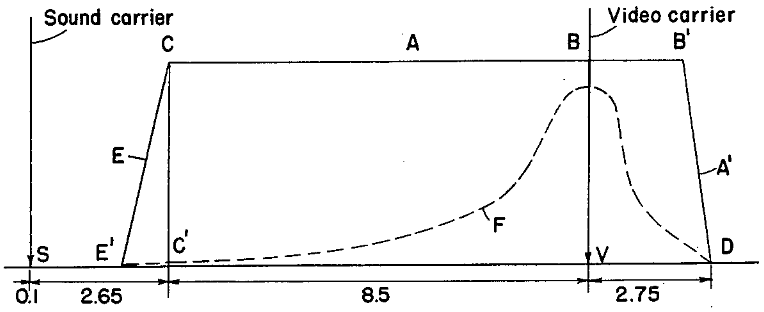

The present invention relates to a television broadcasting system, with a view to allowing of efficaciously covering a territory, regard being had to the conditions of total frequency band allotted for this broadcasting, the one or more picture definitions desired, and the economic, physical and human geography of this territory, namely inclusive of both native population, and temporary population.

Considering in fact the two first conditions, it is quite clear that being given a total width of frequency band allotted for the broadcasting of television in this territory this band can only be divided into a limited number of subsidiary bands or channels determined by the width of band necessary for each transmission with the one or more desired picture definitions; it is very clear, furthermore, that if it is desired to broadcast over this territory a number of programmes greater than this number of channels, by a larger number of stations it is necessary to locate the transmission stations of predetermined power, operating on the same channel, with proper geographic spacings such that jumbling by interference may be avoided.

But these spacings are often incompatible with the features of physical geography of the territory, notably on the surface; furthermore an additional limitation will be imposed by the conditions of the economic and human geography of the territory under consideration, because it is always desirable to place the transmission stations in the immediate neighbourhood of the centres of population of greater density, still more particularly in the centres of working-class concentration.

It is furthermore usual in transmission of television to weaken and even to suppress one of the lateral or side bands of modulation; also to dispose in the working band thus produced carrier frequencies for sound and for vision towards the opposite extremities of this band. In the present specification a television transmitter having one of its radiated sidebands weakened or suppressed will be called a "vestigial sideband transmitter," in accordance with well known terminology.

In accordance with the present invention, I provide that, in a television broadcasting transmitter system comprising a pair of vestigial sideband transmitters each having a sound carrier wave disposed adjacent its unattenuated sideband, and receivers of the superheterodyne kind, the video carrier frequencies of said transmitters, each of an overall frequency bandwidth which is equal to the frequency span of a television channel, are spaced apart the useful width of a video frequency band, the unattenuated sideband of the lower video-carrier-frequency transmitter being the upper sideband and the unattenuated sideband of the higher video-carrier-frequency transmitter being the lower sideband, whereby said unattenuated sidebands are in complete reciprocal overlap between said video carrier frequencies.

In order to ensure transmission and reception which are correct there are provided in each of the transmitters in the transmission of picture signals an absorption or suppression of waves of a frequency equal the sound carrier frequency of the other transmitter, and, in each receiver, rejector circuits ensuring to it a total response, such that it has three rejections, at the places of the sound carrier frequencies and of one of the video-carrier frequencies, undesired, the rejection of the useful carrier frequency to which the receiver is tuned and of the undesired video-frequency being, preferably, ensured at intermediate frequency, whilst the third, that of the undesired sound frequency is, preferably, ensured at a high frequency.

I consequently provide a system for carrying out in the same channel of frequencies a broadcasting of two television programmes radiated by two transmission stations which are geographically adjacent without interference in the reception of these programmes by superheterodyne reception, leading the one and the other of both the bands of video frequencies of the two transmissions into the same band of intermediate frequencies according to the one of the tuning positions of the receivers which is actually selected, wherein the video carrier frequencies are placed in this channel at places of frequency separated by the useful width of the high frequency working band, and that there is only retained as radiated side band, by each of the stations, that side band which lies within this channel of frequencies, ensuring in consequence the reciprocal radiation of the upper side band from the station of lowest video carrier frequency and of the lower side-band from the station of highest video carrier frequency, the sound carrier frequencies being placed at the two ends of the channel and reversed with regard to the relative disposition of the corresponding video carrier frequencies. That is, the sound carrier of highest frequency is assigned to the station having a video carrier of the lower frequency, and vice versa.

I also provide that at each of the transmission stations the high frequency stages incorporate an absorption circuit for suppressing waves of a frequency equal to the carrier frequency for sound of the other station, and in which at each receiver a rejector circuit for rejecting the sound carrier frequency of the undesired transmission is introduced into the input stage before the frequency changer stage whilst the rejector circuits of the carrier frequencies of useful sound and of undesired vision are introduced into the video amplification stage of intermediate frequency.

Figure 2:
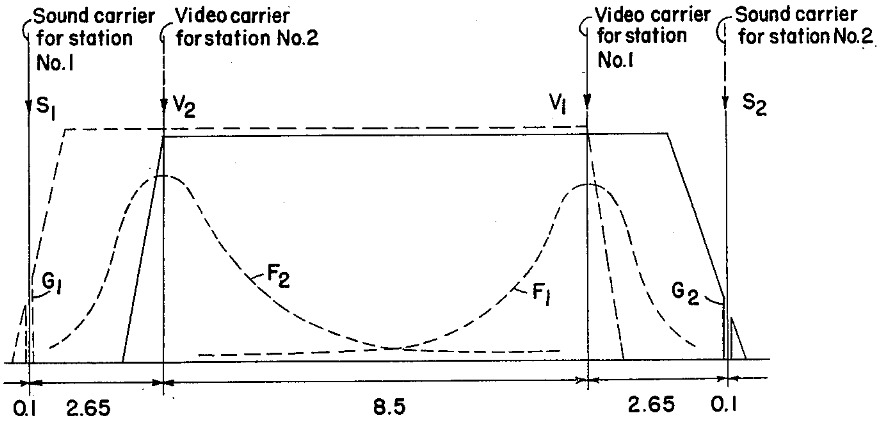
Figure 3:
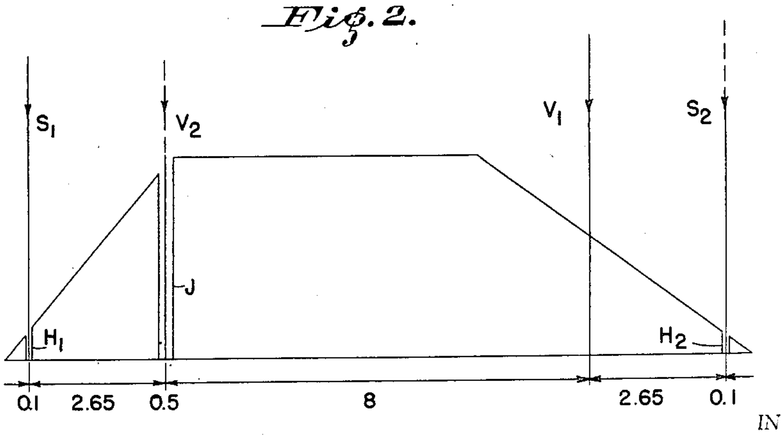

The accompanying drawings illustrate the invention:

Fig. 1 shows an ordinary arrangement of a high frequency working band of a transmitter, Fig. 2 shows the manner of employing a channel of definite width for a given picture definition, in order to ensure the possibility of employment of two different broadcasting programmes simultaneously transmitted, Fig. 3 illustrates a high frequency total response curve for a video-path in accordance with the invention.

Figure 4:
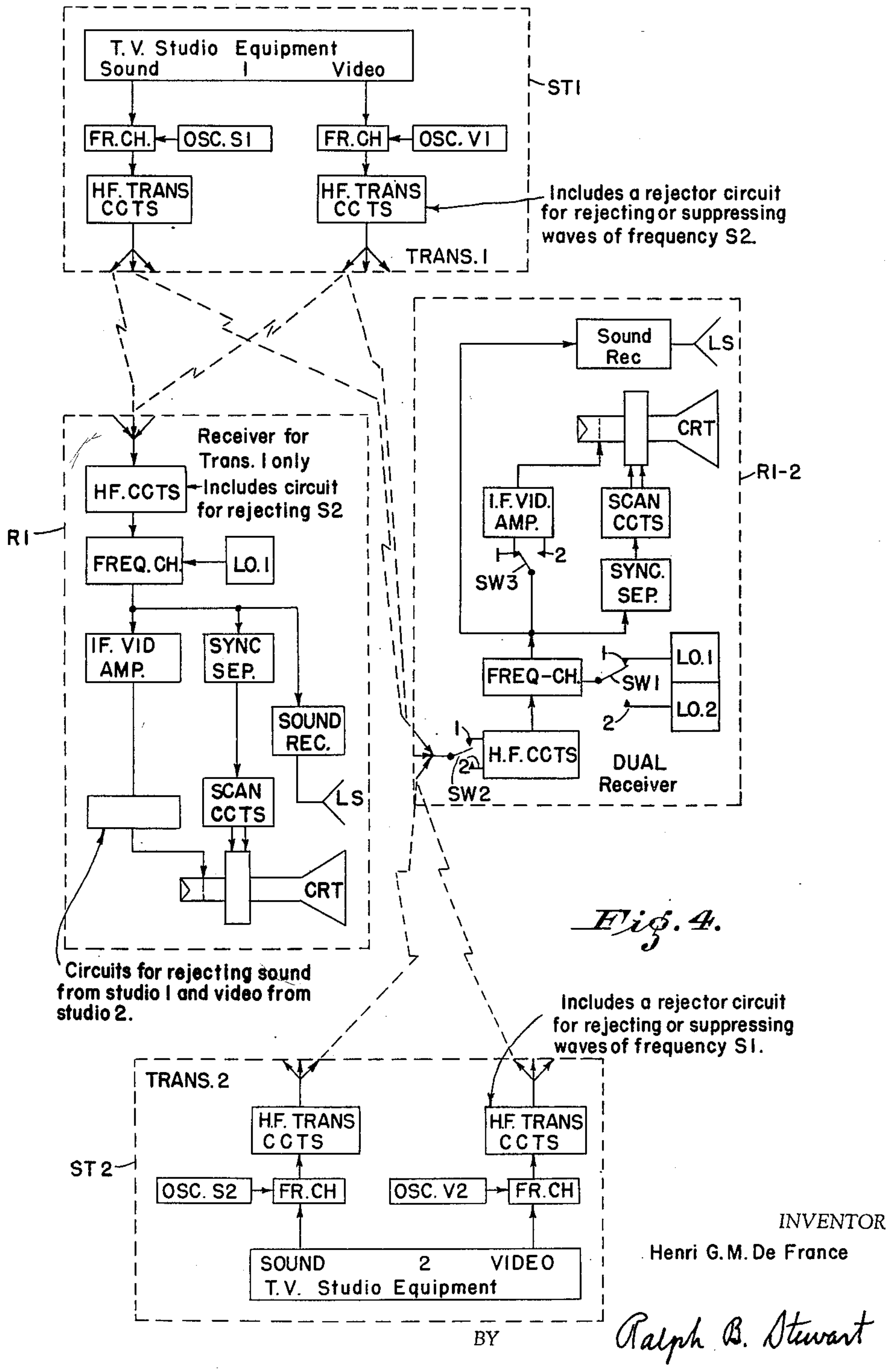

Figure 4 is a block diagram illustrating the arrangements of the two transmitting stations, a receiver for receiving from only one transmitter, and a dual receiver for receiving from either transmitter.

In Fig. 1 the curve A indicates in a general way the overall working band of the transmitter provided for the transmission of the picture signals, with the carrier frequency for picture or vision fixed as at V and the suppressed band having at A′ a relatively rapid weakening of the frequencies that is to say for those frequencies, there is a sudden lowering of the energy level (in decibels), after a protection interval B, B′. Actually, the useful working band has a definite width between the points B, C and relatively rapid weakening beyond the point C, at E, being, in practice, of a very slight range of frequency. The carrier frequency S for sound is fixed beyond this extremity of the video-signal band. At F is indicated the probable character of the spectrum of radiated energy according to the place as regards frequency of the video signals in their band: it will be seen, furthermore, that this energy diminishes rapidly, in all cases, towards the left extremity of the side band A.

Thus, in the case of picture transmission with a high definition, 819 lines, for example, the range B, C is of 8.5 mc./s., the protection range B, B′ is of 2 mc./s., the distance V, D being of 2.75 mc./s., and the range of frequency C′, E′ is less than 1 mc./s. The sound carrier frequency is fixed at 2.65 mc./s. from the point C′ and the correct width of the band for sound transmission is about 0.015 mc./s., with a total protection width of 0.1 mc./s. The total range of the sound and video band or channel of the transmitter is therefore 14 mc./s.

Improvements made by the present invention to devices for broadcasting of television of the type defined, for covering a territory, provide the possibility for arranging two transmission stations, transmitting diffierent programmes, in the same channel, whilst only requiring a moderate geographical spacing between these stations (for example of the order of 100 to 150 km.), from the fact that they provide for operating these stations on reversed unattenuated side bands of their picture or video carrier frequencies, disposed towards the opposite extremities of this channel. Such an arrangement is diagrammatically illustrated in Fig. 2.

The sound carrier frequencies S1 and S2 of the two programmes are arranged at the two extremities of the range of frequency of the channel considered, as indicated, the guard width of each of these sound signal transmissions remaining substantially equal to 0.1 mc./s., in order to make use of the dimensioning illustrated in Fig. 1. At a distance 2.65 mc./s. from the sound carrier wave S1 there is fixed the video carrier frequency V2 of the second programme; similarly, at a distance 2.65 mc./s. from the sound carrier S2 of the second programme, there is interposed, in the band, the video carrier frequency V1. The distance between the two video carriers V1 and V2 remains therefore 8.5 mc./s. which effectively reduces the useful width of the side band employed for each of the transmissions to 8 mc./s., approximately, as will be explained later on. However, the useful side band is the upper side band for the transmission of carrier frequency V2 and, on the other hand, the lower side band for the transmission of video carrier frequency V1, which defines ipso facto the corresponding embodiments of the transmitter. It may be said illustratively that the two transmissions radiate head to foot and foot to head in the channel.

Considering the spectra of probable (statistical) distribution of energy of picture signals on the two radiations, F1 and F2, it will be seen that, in fact, there will only be interference between the frequencies of the end of these spectra, for very small energies, on condition of eliminating, in the receivers, the portion of the spectrum bordering the carrier frequency not desired. Provision is furthermore made, in each of the transmitters, for the absorption or suppression in the transmission of picture signals, of waves of a frequency equal to the sound carrier frequency of the other transmitter, as indicattd at G1 and G2 respectively, in the diagram of Fig. 2, an absorption which can be ensured, in a simple way, by the provision of corresponding rejector circuits in the output stages of these picture signal transmitters.

In Figure 4 the two transmitting stations are shown in the dotted blocks ST1 and ST2, and in each case the output stages for the video signal includes a rejector circuit for suppressing waves of a frequency equal to the sound carrier frequency of the other transmitting station.

Receivers will therefore be so constructed as to present the high frequency total response curve indicated in the diagram in Fig. 3, for a video-path. The second response curve of the video-path of the receiver similar to that of Fig. 3 gives the overall (total) response curve of the receiver, in its video-path, as seen after the frequency changing introduced through the superheterodyne operation. The selection of the one or the other of the two radiated television programs is effected as usual by a change of tuning of the local oscillator frequency such that the conversion into the intermediate frequency band brings one or the other of the H. F. received signals into the I. F. channel, with filtering out of one of the local sidebands of the converter output: in the converted band, however, the conversion carrier will always remain the same, since only one local sideband is permanently filtered out. Hence, as usual, a single side-band of the wave resulting from the mixing in a frequency changing stage of the local oscillation and of the received oscillation is retained and this side-band is always the same, chosen as the band passed through the intermediate frequency amplifier—i. e. the intermediate frequency path of the video signal—that is why a single curve has been shown, its variation being the same for both the received programmes, with the inversion of indices noted above. The two rejection circuits at the places H1 (useful sound) and J (undesired video carrier) are preferably introduced into the intermediate frequency amplifier of the said path for reception of picture signals; the rejection circuit at place H2 (undesired sound) is advantageously introduced into the input circuits of the receiver in order to avoid intermodulations between the carrier frequencies for useful vision employed and for undesired sound. Of course, the adjustment of the receiver to one or other transmission therefore gives the same total response curve of the receiver. It will be seen by reason of the absorption of one part of the band of frequencies, the approximate range equals 0.5 mc./s., at place J, the width of useful working band for each of the transmitters for video signals is brought back to 8 mc./s., approximately.

In Figure 4 the block diagram circuits shown within the dotted rectangle R1 represents a receiver which is pre-set for receiving transmission from station ST1 only. As indicated in the diagram, the high frequency receiving circuit includes a circuit for rejecting the carrier wave of the sound signal of station ST2. Also, the intermediate frequency amplifier channel for the video signal includes circuits for rejecting the sound signal from studio 1 and the video signal from studio 2.

Within the rectangle R1–2 of Figure 4 is represented a dual receiver which may be adjusted to receive the signal from either studio ST1 or studio ST2. The adjustment for reception from one transmitting station or the other may be accomplished in the conventional manner, either by adjustment of tunable circuits, or by switching in pre-set circuits. The circuit for the dual receiver is the same as for the single receiver shown at R1, except for the adjustments required to apply the correct frequency from the local oscillator and for adjusting the various rejector circuits to the proper values for receiving the desired signal. In the drawing, pre-set circuits are selected by means of simple two-position switches SW1, SW2 and SW3. When these switches are moved to the position 1, the receiver is adjusted or set for receiving from studio ST1. Switch SW1 connects in a local oscillator of a frequency equal to the frequency of the local oscillator LO1 in receiver R1. Switch SW2 completes high frequency circuits through rejector circuits for rejecting the carrier wave S2 from station ST2. Switch SW3 completes the video intermediate frequency amplifier channel through rejector circuits which reject sound from studio 1 and video signal from studio 2.

When the three switches are moved to position 2, the dual receiver is set for receiving signals from station ST2. Switch SW1 changes the frequency of the local oscillator supplied to the frequency changer in the heterodyne receiver. Switch SW2 completes the high frequency receiving stages through a rejector circuit for rejecting the carrier S1 of studio ST1, and switch SW3 completes the intermediate frequency video channel through rejector circuits for rejecting sound from studio 2 and video signal from studio 1.

Furthermore in order to avoid at the receiver traces of interferences of higher modulation frequencies of the undesired transmission, traces which appear in the form of immovable vertical lines, provision is made for operating on transmission a shifting of the phase of the sector of one of the stations relative to the other. Thus, these lines will be displaced with the speed of this shifting of phase, periodically, and if sufficiently strong, the spectator will only have the impression of a substantially uniform background because of confusion on the retina, of lines in rapid relationship.

The phase shifting of the sector may be operated by means which are well-known, such as a mechanical system for example, a rotary machine of which the collector is progressively displaced at the desired speed.

I claim:

1. A television broadcasting system comprising a pair of vestigial side-band transmitters each having means to transmit a sound carrier wave disposed adjacent its unattenuated sideband and having superheterodyne-type receivers characterized by the fact that the video carrier frequencies of said transmitters, each of which transmitters has a radiated overall frequency bandwidth equal to the frequency span of a television channel, are spaced apart in said channel span by the useful width of a video frequency band, the unattenuated sideband of the transmitter of lower video carrier frequency being the upper side band and the unattenuated sideband of the transmitter of higher video carrier frequency being the lower sideband, whereby the unattenuated sidebands are radiated in complete overlap between said spaced apart video frequency carriers.

2. A television broadcasting system according to claim 1 comprising in each of said transmitters an absorption circuit for suppressing waves of a frequency equal to the sound carrier frequency of the other transmitter of the pair and further comprising in each receiver a first rejection circuit in the high frequency amplifier stage tuned to reject the sound carrier of the unselected program and two rejection circuits in the intermediate frequency amplifier of the video channel tuned to reject respectively the sound carrier of the selected program and the video carrier of the unselected program.

References Cited in the file of this patent

FOREIGN PATENTS 778,104 France ................ Mar. 9, 1935